Aug. 4, 1964     J. C. TWEDDELL     3,142,936
FLOWER VASE WITH FLOWER STEM-POSITIONING DEVICE
Filed Dec. 14, 1962
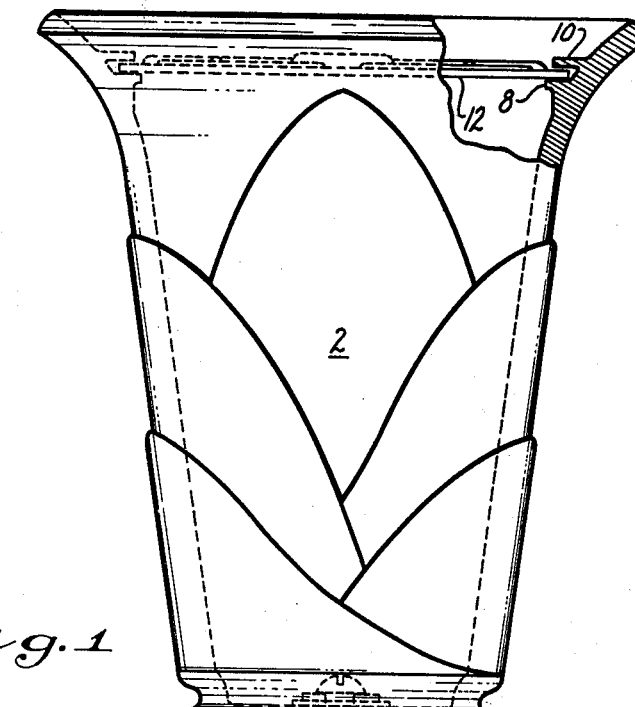
Fig. 1
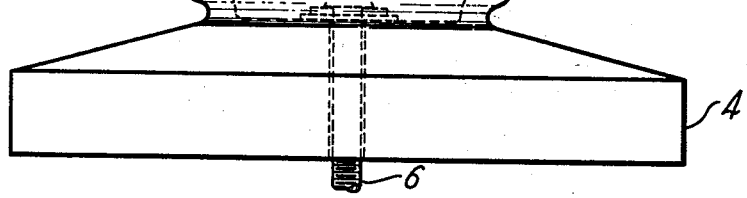
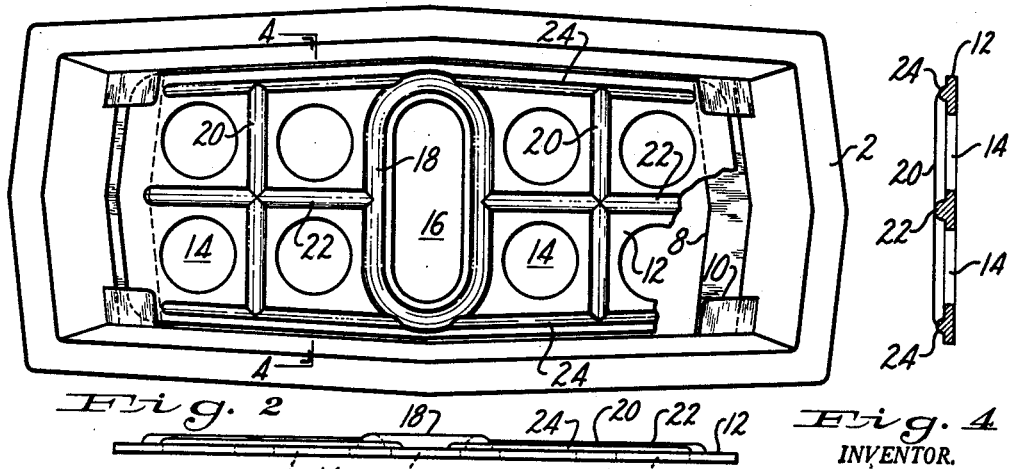
Fig. 2     Fig. 3     Fig. 4
INVENTOR.
JAMES TWEDDELL
BY
Karma W Dodd

United States Patent Office 3,142,936
Patented Aug. 4, 1964

3,142,936
FLOWER VASE WITH FLOWER STEM-POSITIONING DEVICE
James C. Tweddell, Bethel Park, Pa., assignor to
James H. Matthews & Company
Filed Dec. 14, 1962, Ser. No. 246,297
3 Claims. (Cl. 47—41)

My invention relates to a limited use container and more particularly to a memorial type flower vase having removable flower positioning means therein.

Vases for use in cemeteries or in similar memorial type situations where they are exposed to the weather present a number of problems. The vases should be simple of construction yet sturdy because they have to stand long exposure to adverse weather conditions. At the same time it is necessary that the vases portray an excellence of decorum which is consistent with the dignity of man. These vases should therefore be so constructed that it is difficult for them to be removed either accidentally or intentionally, in other words, they should be erected in a semi-permanent condition and at the same time they should be so constructed as to be easily cleaned.

With the simple traditional type open top vase which is erected in a semi-permanent upright position, the top of the vase is left open and flowers placed therein loosely and when the flowers are removed the vase presents an unobstructed opening into its interior so that it may be periodically sponged out to keep the interior of the vase clean. However, it has been found desirable to have a vase incorporating some means of holding the flower stems of relatively stiff stemmed flowers in a fixed position horizontal with respect to each other so that the arrangement is controlled and so that the arrangement is not subject to variations due to wind and similar factors.

It is therefore an object of my invention to provide an improved memorial vase.

It is another object of my invention to provide a memorial vase having means incorporated therein, which is readily removable and which is capable of giving a large amount of substantially individual horizontal stability of position to the stems of flowers therein.

It is an ancillary object of my invention to provide a memorial vase having, incorporated therein, permanent means for positively securing a flower positioning device within said vase.

The flower vase and flower positioning device therein in accordance with my invention are distinguished from the prior art so far as I am aware, by reason of the fact that the flower positioning device comprises a plastic insert which is sufficiently rigid to hold flower stems in a predetermined position and yet is sufficiently flexible to be removed by distortion, that means are provided in the form of shoulders cooperating with corner fillets or studs to produce a positive retention of the flower positioning device within the vase that the flower positioning device is adapted to hold one dozen flowers with less than a dozen openings, that this is accomplished by having four holes toward each end and one larger hole in the center into which four stems are inserted together, it being found that the large hole in the center is desirable to allow for easy grasping of the positioning device with the fingers of the operator in order to remove and replace the flower positioning device while at the same time maintaining a high degree of control over lateral movement of the flower stems extending through the center hole. In addition, I have provided for reinforcing ribs on the flower positioning device which are integral with the flower positioning device which are so organized, as described hereinafter, that they produce the necessary rigidity for maintaining large stemmed flowers in position while at the same time allowing sufficient flexibility to allow removal of the flower positioning device from the interior of the vase without exceeding the elastic limit of any portion of the flower positioning device. Thus, the plastic flower positioning device may be removed, the vase cleaned or sponged out and the positioning device replaced easily without the reasonable possibility of losing accessory parts.

My invention will be better understood from the following description when read in connection with the accompanying drawing in which:

FIGURE 1 is a front elevational view partially in section, of a vase in accordance with the preferred embodiment of my invention, partially cut away so as to show the flower positioning device of the said vase.

FIGURE 2 is a plan view of the vase shown in FIGURE 1 wherein the flower positioning device has been partially cut away so that one of the support shoulders on the vase may be more clearly visualized.

FIGURE 3 is a showing in elevation from the front of the flower stem positioning insert shown in FIGURE 2.

FIGURE 4 is a showing in section of the flower stem positioning insert taken along the line 4—4 of FIGURE 2.

In accordance with the preferred embodiment of my invention I provide a memorial vase 2 for holding flowers having relatively thick stems. The horizontal cross sectional form of the vase is of generally oblong configuration wherein the sides and the ends are almost flat. The sides and the ends are sufficiently flat to provide definite lines of demarcation between the sides and the ends. The vase itself is fastened in a semi-permanent manner to a stone or similar substance by means of a screw or support bolt 6 extending through the bottom of the vase down through the base of the vase and into an anchor piece which is embedded in the stone. A washer of flexible material such as rubber is provided around the support bolt inside the vase so as to prevent water leakage from the vase.

The main body of the vase rising from the bottom is generally tapered outward slightly toward the top. This angle of taper is slight, being approximately between five and ten degrees from the vertical.

At the top of the vase is a top rim which is flanged outward to produce an artistic effect. This outward flange at the top of the vase is generally above and independent of the functional flower support elements inside which will be described hereinafter.

At each end of the vase in the interior thereof spaced approximately ⅝" from the top of the vase I provide horizontally disposed shoulders 8 for supporting a plastic flower positioning device or insert 12 inside the vase. At each of the four corners on the inside of the vase a short distance above the supporting shoulders 8 I provide corner fillets or studs 10 which cooperate with the shoulders to hold the plastic flower positioning device 12 in place. The shoulders 8 extend inward approximately ¼" and the corner fillets extend inward so as to be almost co-extensive with the shoulders. Preferably, the shoulders 8 should extend slightly further into the interior of the vase than the fillets 10. However, in accordance with other embodiments of my invention, for reasons which will be described more fully hereinafter, the shoulders and the fillets may be co-extensive or the fillets may even extend slightly beyond the shoulders.

Inside the vase and resting on the shoulders I provide an oblong plastic insert 12 which acts as a flower positioning device so as to insure a permanent arrangement of flowers placed in the vase. The plastic insert lies in a horizontal plane with its sides conforming to the sides of the vase and being retained in a fixed position by cooperative action between the shoulder at each end of the vase and the cooperating corner fillets.

The plastic insert 12 has four holes 14 therethru at each end, arranged in substantially a square formation, the region occupied by the square for motion of the four holes at each end occupying approximately one third of the length of the flower positioning device 12. In the center of the plastic insert there is a larger oval shaped hole or slot 16 extending in a transverse direction, i.e., the long dimension of the center hole extends across the short dimension or width of the plastic insert. The sides of the center slot 16 are straight and parallel and the ends of the center hole are rounded. The center hole is slightly larger in width than the four holes on each side of it and is greater in length than twice the diameter of any small holes. The center slot 16 is preferably of a dimension of 1 and 9/16 inches long and 5/8 inch wide whereas the four holes 14 on each side of the center slot 16 are circular holes with 19/32" diameter. Thus, the plastic insert is made with eight circular holes 14 therethru disposed so that four of them are on each side of the center slot 16 which slot extends across the width or narrow dimension of the flower positioning device 12.

Side edge reinforcing ribs or ridges 24 are provided along each side of the insert spaced approximately half way between the edges of the holes 14 and the edge of the insert. Slightly larger intermediate reinforcing ribs 20, 22 are provided between the holes of each set of four holes in such a manner that the intermediate ribs 20, 22 form a plus sign or a bottom-truncated cross. The size of the interior reinforcing ribs between the holes of each group of four holes is such that each of their cross-sectional dimensions is approximately twice the cross-sectional dimension or area of each of the ribs along or near the edges of the plastic insert. The intermediate ribs 20 extending crossways of the insert, e.g., across the narrow dimension of the insert, contact and overlap the side edge reinforcing ribs. A slot reinforcing rib 18 which is a reinforcing rib is provided which extends around the edge of the center slot and is slightly displaced from the edge of the center slot. The center slot reinforcing rib is slightly greater in cross-sectional area than are the interior ribs 20, 22 which lie between the holes of each set of four holes. The interior rib 22 at each end which extends parallel to the long dimension of the insert extends from a point approximately 1/4" from the end of the insert to a point of engagement and joinder with the center slot reinforcing rib.

To better understand my invention, it will be noted that if a long flat piece of relatively stiff material is bent about a fulcrum at its center substantially all of the curvature will occur at the center and the portions between the center and the ends will remain relatively straight. It was desired that my plastic insert be inserted by a bending action as for example it may be inserted into position in the vase by bending wherein one end is placed under the fillets at one end of the vase and the fingers of the operator are placed through the slot so as to pull up on the center of the insert while the other end is forced down into the region between the shoulder and the fillets at the other end of the vase. If a plain flat piece of plastic material were employed most of, or practically all of, the curvature would occur at the center of the plastic insert and there would be a substantial tendency for the insert to break at the center. However, by arranging ribs in accordance with my invention, I discourage bending at the center and encourage bending further toward the ends. The bending that occurs in the plastic insert therefore substantially corresponds to the arc of a circle and thereby is spread out over the entire length of the plastic insert instead of being concentrated at the one region of normally expected maximum weakness which is the region adjacent the ends of the slot in the center.

While one might look at the device thus described and conclude that all that the reinforcing ridges do is to strengthen the piece where it is subject to the greatest distortion, however, it will be noted that the primary function of these ribs is not to strengthen the insert in the region of greatest distortion but instead it operates to prevent distortion from being unreasonably large at any one point. In other words, the ribs are not arranged so as to overcome adverse effects of distortion or deformation in the region where they are located but instead are arranged so as to minimize deformation or distortion where they are located.

What I claim is:

1. A vase flower positioning device comprising an oblong semi-rigid insert, said insert having a center slot extending across the short dimension of said insert of sufficient size to allow insertion of two fingers of an operator, said insert having four holes on each side of said center slot arranged in square formation, and means comprising longitudinal reinforcing ribs distributing angular distortion substantially uniformly over the length of the insert when force is applied to each end about a fulcrum located at the center.

2. A flower positioning device for use in the top of a flower vase which is oblong in cross section, comprising: a flat piece of plastic material having an oblong shaped center slot therein with the long dimension of said center slot extending across the width of said positioning device and having a plurality of holes on either side of said slot, a pair of side reinforcing ribs attached to and forming an integral part of said flat piece extending along each side of said flat piece near the edge thereof and stopping short of the end of such flat piece a sufficient distance to allow a retaining fillet to lie flat against said flat piece at the end thereof, longitudinal interior ribs extending longitudinally of said piece near the center thereof and along the region between adjacent holes, and lateral ribs extending across said piece in the regions between said plurality of holes and being joined at either end thereof to said side ribs and an oblong rib of larger diameter than that of said side ribs and said interior ribs extending completely around said slot and being joined to said ribs and said interior ribs.

3. A flower vase comprising: a rigid container of horizontal oblong cross-section, said container having means for supporting integral with said container in the interior thereof and presenting a plurality of support points near each end of said container near the top of said container, said support points lying in a common horizontal plane; a horizontally extending flower stem support piece of semi flexible perforated plastic material being in size substantially coextensive with the interior cross-section of said container as taken through the region of said support points and resting on the support points presented by said means; and said container comprising a plurality of integral restraining projections located near each end of said container and being above and adjacent to said flower stem support piece.

References Cited in the file of this patent

UNITED STATES PATENTS

| | | |
|---|---|---|
| 1,959,510 | Van Waveren | May 22, 1934 |
| 2,064,707 | Wilson | Dec. 15, 1936 |
| 2,226,326 | Atkisson et al. | Nov. 4, 1941 |
| 2,818,681 | Coplen | Jan. 7, 1958 |
| 2,891,354 | Smithers | June 23, 1959 |
| 2,900,760 | Tupper | Aug. 25, 1959 |

FOREIGN PATENTS

| | | |
|---|---|---|
| 6,594 | Great Britain | Mar. 18, 1904 |
| 291,915 | Great Britain | June 14, 1928 |